United States Patent
Bishop et al.

(10) Patent No.: US 9,916,342 B2
(45) Date of Patent: Mar. 13, 2018

(54) SYSTEM AND METHOD FOR LICENSE RECLAMATION

(71) Applicant: Branch Banking and Trust Company, Raleigh, NC (US)

(72) Inventors: Chris Bishop, Zebulon, NC (US); Jason Pedone, Raleigh, NC (US)

(73) Assignee: Branch Banking and Trust Company, Raleigh, NC (US)

( * ) Notice: Subject to any disclaimer, the term of this patent is extended or adjusted under 35 U.S.C. 154(b) by 300 days.

(21) Appl. No.: 13/854,302

(22) Filed: Apr. 1, 2013

(65) Prior Publication Data

US 2013/0262401 A1   Oct. 3, 2013

Related U.S. Application Data

(60) Provisional application No. 61/617,821, filed on Mar. 30, 2012.

(51) Int. Cl.
*G06F 17/30* (2006.01)
*G06Q 10/00* (2012.01)

(52) U.S. Cl.
CPC ....... *G06F 17/30371* (2013.01); *G06Q 10/20* (2013.01)

(58) Field of Classification Search
CPC .......................... G06Q 10/20; G06F 17/30371
See application file for complete search history.

(56) References Cited

U.S. PATENT DOCUMENTS

| | | | | |
|---|---|---|---|---|
| 5,495,610 | A * | 2/1996 | Shing et al. | 709/221 |
| 8,381,208 | B2 * | 2/2013 | Burke et al. | 717/174 |
| 8,413,135 | B2 * | 4/2013 | Aaron | 717/174 |
| 8,448,160 | B2 * | 5/2013 | Vincent et al. | 717/168 |
| 8,782,635 | B2 * | 7/2014 | Burke et al. | 717/174 |
| 2001/0011253 | A1 * | 8/2001 | Coley et al. | 705/59 |
| 2007/0234343 | A1 * | 10/2007 | Gouge et al. | 717/174 |
| 2008/0005733 | A1 * | 1/2008 | Ramachandran et al. | 717/168 |
| 2008/0005787 | A1 * | 1/2008 | Aldred | G06F 21/105 726/4 |
| 2008/0201705 | A1 * | 8/2008 | Wookey | 717/175 |
| 2010/0057703 | A1 * | 3/2010 | Brandt et al. | 707/4 |
| 2010/0306319 | A1 * | 12/2010 | Brzozowski | 709/206 |
| 2011/0202912 | A1 * | 8/2011 | Itoh | 717/177 |
| 2012/0174090 | A1 * | 7/2012 | Carollo et al. | 717/173 |
| 2012/0255025 | A1 * | 10/2012 | Roshchin | G06F 21/105 726/26 |
| 2012/0331455 | A1 * | 12/2012 | Ayachitula et al. | 717/171 |
| 2013/0198734 | A1 * | 8/2013 | Biswas et al. | 717/174 |

OTHER PUBLICATIONS

Steve Seguis, "Querying Installed Software Remotely", Feb. 11, 2004, pp. 1-5.*

* cited by examiner

*Primary Examiner* — Apu Mofiz
*Assistant Examiner* — Jared Bibbee
(74) *Attorney, Agent, or Firm* — Duane Morris LLP

(57) ABSTRACT

The present disclosure describes systems and methods for managing and implementing an asset license reclamation program across a network. The status of an asset, such as computer software, is automatically determined and if the asset does not meet particular use criteria, the asset may be flagged for reclamation and/or redeployment, either within the same network segment or in a separate network segment.

21 Claims, 4 Drawing Sheets

SYSTEM AND METHOD FOR LICENSE RECLAMATION

RELATED AND CO-PENDING APPLICATIONS

This application claims priority to U.S. provisional application entitled "Desktop Software License Reclamation Process", Ser. No. 61/617,821 filed 30 Mar. 2012, the entirety of which is hereby incorporated herein by reference.

BACKGROUND

Managing desktop or workstation software/assets becomes an increasingly complicated matter as the size and structure of an organization increases and becomes more intricate. Additionally, the cost of software licenses is a major factor to be taken into account when planning and budgeting for a business unit or for the whole organization. Many businesses attempt to apply simple licensing management techniques that are only applicable for a small business network to a large and complex network system. Consequently, the business either purchases many more licenses for a piece of software than are necessary or fails to timely purchase necessary software because uninformed anecdotal information insists that sufficient software licenses have previously been purchased.

Additionally, for organizations that have a computer network that is divided into multiple segments, such as different cost centers, where the cost of a license must be associated with a particular cost center, there is a need to keep track of which segment/cost center a particular license is being used and/or assigned.

Accordingly, there is a need for a license reclamation and/or deployment method and system which solves the above problems.

DETAILED DESCRIPTION

Figure 1:
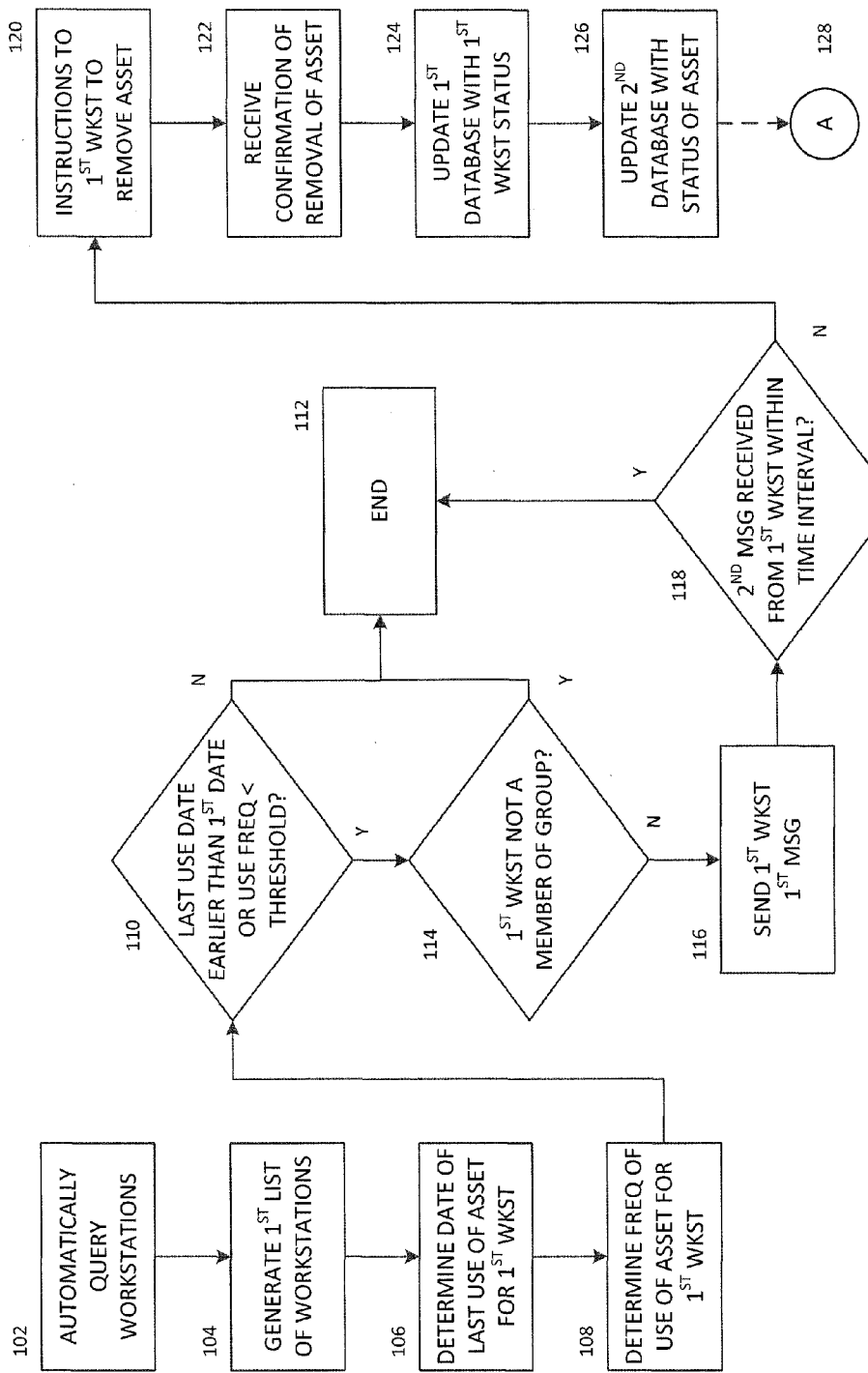
FIG. 1 is a flow chart for a method for managing an asset in a network according to an embodiment of the present subject matter.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of embodiments of the present subject matter may be directed towards or reference specific systems and/or methods of managing assets in a network, it is to be understood that the discussion is not intended to limit the scope of the present subject matter in any way.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

With reference to the figures where like elements have been given like numerical designations to facilitate an understanding of the present subject matter, various embodiments of a system and method for managing assets in a computer network are described.

The present disclosure describes novel systems and methods for managing and implementing an asset license reclamation program across a network. In an embodiment, the status of an asset, such as computer software, is automatically determined and if the asset does not meet particular use criteria, the asset may be flagged for reclamation and/or reuse, either within the same network segment or in a separate network segment.

In certain embodiments, a system for managing a license reclamation and/or deployment program may include various components and/or processors in a network, such as, but not limited to, a desktop/workstation management system, a license reclamation system, an asset inventory system, a procurement system, a personnel system, an information technology management system, a system administration system, and one or more databases. These various systems may be centrally located in one or more computers/processors or the systems may be dispersed throughout the network. The network may be internal to a particular organization or the network may span two or more organizations. Furthermore, the network may have two or more segments, such as cost centers, where the cost of an asset may be assigned, for accounting purposes, to the particular cost center associated with the workstation on which the asset is installed.

At a high level, embodiments of the present subject matter provide for a system and method for reclamation/redeployment of assets on a network by targeting an asset for reclamation, discovering which workstations on the network have the asset installed, reclaiming the asset if certain predetermined criteria (which may be configurable) are met, and redeploying and/or inventorying the asset for use by another workstation.

With attention drawn to FIG. 1, a flow chart 100 is presented for a method for managing an asset in a network according to an embodiment of the present subject matter. At block 102, a set of workstations connected to a computer network are automatically queried to determine which, if any, of the workstations have an asset (such as, but not limited to, a particular software program or module) installed thereon. Those of skill in the art will understand that the query may be made for more than one asset or for a particular combination of assets. The set of workstations may be all the workstations on a network or some predetermined subset of workstations. Additionally, in an embodiment, certain workstations in the set of workstations are in a first segment of the network while other workstations in the set of workstations are in a second segment of the network. Those of skill in the art will readily understand that there may be one, two, or more segments of the network. In another embodiment, each segment is associated with a specific cost center such that, for example, the first segment is associated with a first cost center and the second segment is associated with a second cost center which is different than the first cost center. At block 104, a list of the workstations that were queried is generated. In an embodiment, the list includes identifying information for those workstations with which the asset is currently associated.

At block 106, for one of the workstations on the list generated at block 104, referred to in this exemplary discussion as "Workstation A" or "$1^{ST}$ WKST", a determination is made as to when the asset was last used by Workstation A. In an embodiment, the date of last use determination is made for some or all of the workstations on the list. At block 108, for Workstation A, a determination is made regarding the frequency of use of the asset by Workstation A during a first predetermined time interval. In an embodiment, the first predetermined time interval is 90 days. Those of skill in the art will readily realize that other first predetermined time intervals may be used and are contemplated herein. In another embodiment, the first predetermined time interval is the same as the time interval between the current automatic query at block 102 and a previously-initiated automatic query for the same asset, which may be referred to as a Usage Collection Interval, which may be configurable.

At block 110, if the last use date of the asset for Workstation A determined at block 106 is earlier than a predetermined date or if the frequency of use of the asset by Workstation A is less than a predetermined threshold value, then the process continues to block 114. Otherwise, the process ends at block 112. In an embodiment, the predetermined date is 90 days prior to the current date (e.g., the calendar date when the determination at block 110 occurs). In other embodiments, the predetermined date is 90 days prior to the date of the automatic query at block 102 or the predetermined date is equal to the number of days of the Usage Collection Interval prior to the current date. In an embodiment, the predetermined threshold value is two. Those of skill in the art will readily understand that other values for the threshold may be used and are contemplated herein.

At block 114, if Workstation A is not a member of a predetermined group, then the process continues to block 116. Otherwise, the process ends at block 112. In an embodiment, members of the predetermined group include those workstations (not necessarily limited to the workstations on the list generated at block 104) that have previously opted-out of the asset reclamation and/or removal program, and/or those workstations that have previously received instructions to remove the asset. At block 116, Workstation A is sent a first message regarding the asset. In an embodiment, the first message is an asset reclamation/removal notification for Workstation A. In an embodiment, the first message is sent via electronic mail, although other electronic communication means are also contemplated.

At block 118, if a second message is received from Workstation A within a second predetermined time interval, then the process ends at block 112. Otherwise, the process continues to block 120. In an embodiment, the second message is an opt-out message indicating that the asset is needed at Workstation A and thus Workstation A is opting out of the asset reclamation and/or removal program. In another embodiment, the second predetermined time interval is 30 days, although those of skill in the art will understand that other time intervals are possible and are contemplated herein. At block 120, instructions are sent to Workstation A to reclaim/remove the asset. In an embodiment, the instructions are sent via electronic mail, although other electronic communication means are also contemplated.

At block 122, a communication from Workstation A is received confirming reclamation/removal of the asset from Workstation A. In an embodiment, the confirmation communication is sent via electronic mail, although other electronic communication means are also contemplated. At block 124, a first database is updated with the status of Workstation A regarding the asset. In an embodiment, the first database is a reclamation database. In a further embodiment, the first database includes information regarding those workstations on the list of workstations generated at block 104. In a still further embodiment, the first database includes information regarding the set of workstations discussed above with respect to block 102, such as, but not limited to, which of the set of workstations are members of the predetermined group of workstations discussed above at block 114. At block 126, a second database is updated with an indication of the availability of the asset. In an embodiment, the second database is an inventory management database. In another embodiment, the indication of the availability of the asset includes information regarding the availability of a license for the asset. In still another embodiment, the second database provides access to one or more workstations in the set of workstations connected to the computer network for use of the asset on that particular workstation obtaining access to the second database. In yet another embodiment, the first and second databases are the same.

Figure 2:
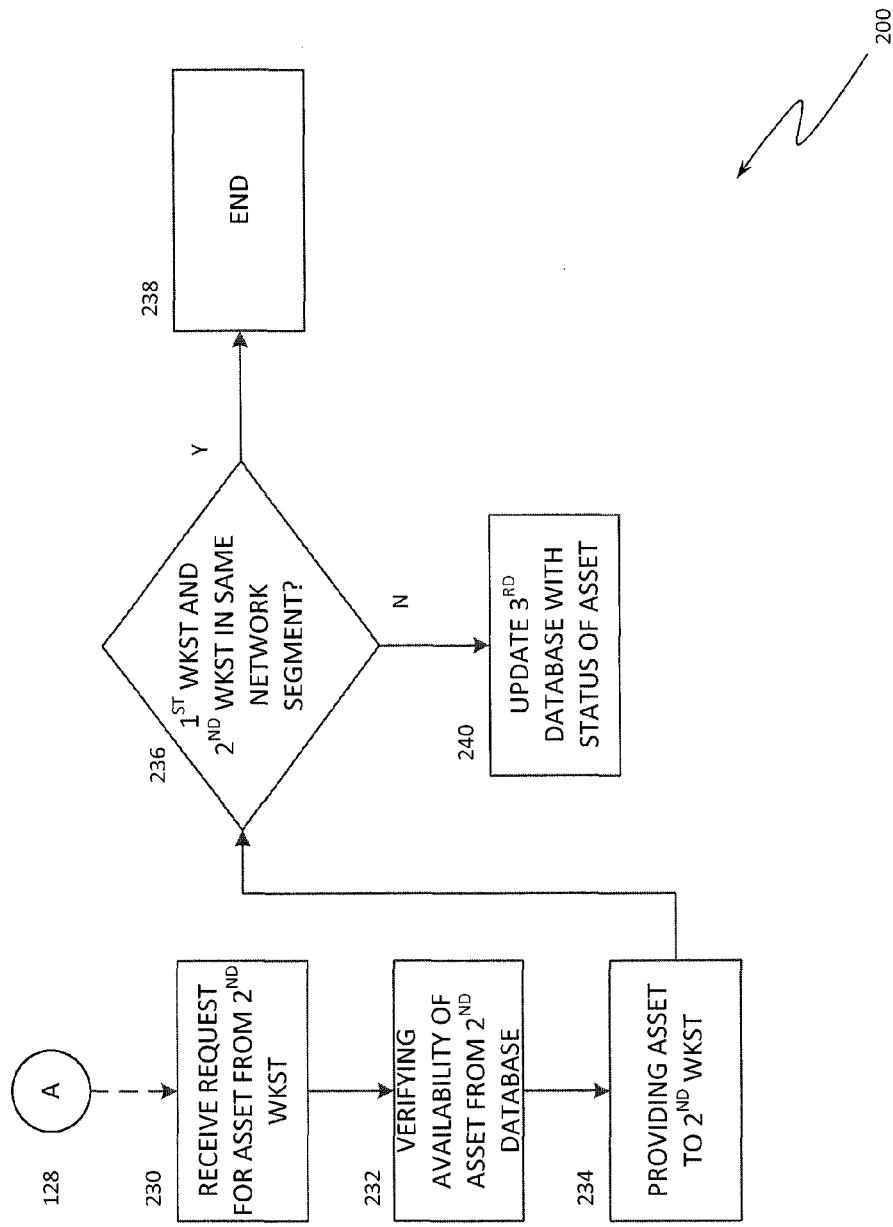
FIG. 2 is a flow chart for a further method for managing an asset in a network according to an embodiment of the present subject matter.

The process may end at block 126 or, optionally, the process may continue to block 128, which proceeds to FIG. 2.

Now turning to FIG. 2, a flow chart 200 is presented for a further method for managing an asset in a network according to an embodiment of the present subject matter. At block 230, a request for use of the asset is received from a second workstation connected to the computer network, referred to in this exemplary discussion as "Workstation B" or "$2^{ND}$ WKST". At block 232, the availability of the asset is verified from the second database which, in an embodiment, is an inventory management database. At block 234, the asset is provided to Workstation B for installation. In an embodiment, the process of providing the asset to Workstation B for installation includes generating a default invoice and sending the default invoice to a fourth database. In a further embodiment, the fourth database is a procurement database. In a still further embodiment, the default invoice is a zero dollar invoice.

At block 236, a determination is made as to whether Workstation A and Workstation B are in the same segment of the network. If Workstation A and Workstation B are in the same segment of the network, the process ends at block 238. If Workstation A and Workstation B are not in the same segment of the network, the process continues to block 240 where a third database is updated with information regarding the disposition of the asset, i.e., that the asset is installed on Workstation B. In an embodiment, the third database is an asset management database. In a further embodiment, any two, three, or all four of the first, second, third, and fourth databases may be the same database.

Figure 3:
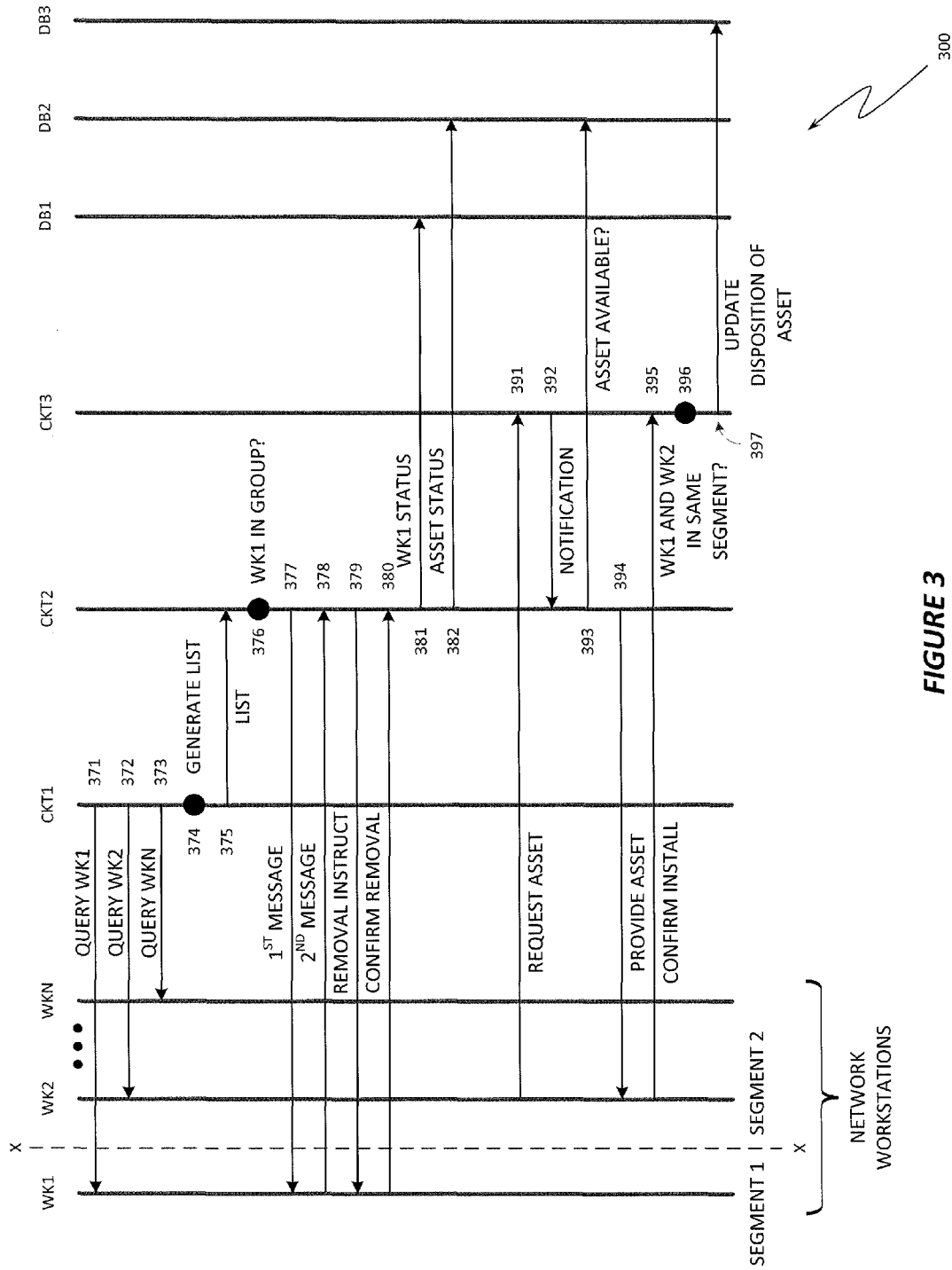
FIG. 3 is a network component diagram illustrating a flow of information across the network components in a system for managing an asset in a network according to an embodiment of the present subject matter.

With attention now drawn to FIG. 3, a network component system diagram 300 is depicted which illustrates a flow of information across the network components in a system for managing an asset in a network according to an embodiment of the present subject matter. The network components shown include a first workstation (designated "WK1"), a second workstation (designated "WK2"), and additional workstations designated generally by "WKN". As shown in FIG. 3 by dotted line X-X, workstation WK1 is a member of segment 1 of the network while workstations WK2 through WKN are each members of segment 2 of the network. As discussed above, each segment may be associated with a particular cost center. Further components shown include first circuitry (designated "CKT1"), second circuitry (designated "CKT2"), and third circuitry (designated "CKT3"). Those of skill in the art will readily understand that these circuitry designations may include, individually or collectively, one or more processors. Additional components shown include a first database (designated "DB1"), a second database (designated "DB2"), and a third database (designated "DB3"). Those of skill in the art will readily understand that any combination of these databases may form a single database.

In the network component system diagram 300, CKT1 automatically queries a set of workstations (as shown by arrows 371, 372, and 373) connected to a computer network to determine which, if any, of the workstations have an asset (such as, but not limited to, a particular software program or module) installed thereon. The set of workstations may be all the workstations on a network or some predetermined subset of workstations.

CKT1, at 374, then generates a list of the workstations that were queried where the list includes identifying information for those queried workstations with which the asset is currently associated. In this example, the asset is loaded on/associated with workstation WK1 and therefore WK1 is on the list. In an embodiment, CKT1, at 375, forwards the list to CKT2. In another embodiment, CKT1 and CKT2 are components of the same processor. CKT2, at 376, determines if WK1 is a member of a predetermined group. As discussed above, CKT2 determines the date of last use of the asset on WK1 and determines the frequency of use of the asset by WK1 during a first predetermined time interval. Also at 376, CKT2 determines if WK1 is a member of a predetermined group (e.g., those workstations that have previously opted-out of the asset reclamation and/or removal program, and/or those workstations that have previously received instructions to remove the asset), as discussed above, by determining if the last use date of the asset for WK1 is earlier than a predetermined date or if the frequency of use of the asset by WK1 is less than a predetermined threshold value.

If CKT2 determines that WK1 is not a member of the predetermined group, then at 377, CKT2 sends a first message regarding the asset (e.g., an asset reclamation/removal notification) to WK1. In an embodiment, the first message is sent via electronic mail, although other electronic communication means are also contemplated. WK1 then sends a second message, designated as 378, to CKT2. If CKT2 does not receive the second message (e.g., an opt-out message) from WK1 within a second predetermined time interval, as discussed above, then CKT2, at 379, sends instructions to WK1 to reclaim/remove the asset. In an embodiment, the instructions are sent via electronic mail, although other electronic communication means are also contemplated. Once the asset is removed from WK1, at 380, a message confirming reclamation/removal of the asset from WK1 is sent from WK1 to CKT2. In an embodiment, the instructions are sent via electronic mail, although other electronic communication means are also contemplated.

CKT2, at 381, sends information to DB1 updating DB1 with the status of WK1 regarding the asset. CKT2, at 382, sends information to DB2 updating DB2 with information regarding the availability of the asset.

Optionally, the network component system diagram 300 may also function whereby WK2 sends a request, at 391, to use the asset, which request is received by CKT3. CKT3 then sends a notification 392 regarding the request to CKT2. CKT2, at 393, verifies from DB2 that the asset is available. After the availability of the asset is verified, CKT2, at 394, provides the asset to WK2 for installation. After installation, WK2, at 395, sends an installation confirmation message to CKT3. CKT3, at 396 determines if WK1 and WK2 are in different segments of the network (which for this example, as shown in FIG. 3, they are). At 397, CKT3 updates the disposition of the asset in DB3 when the condition where WK1 and WK2 are in different segments of the network is met.

Figure 4:
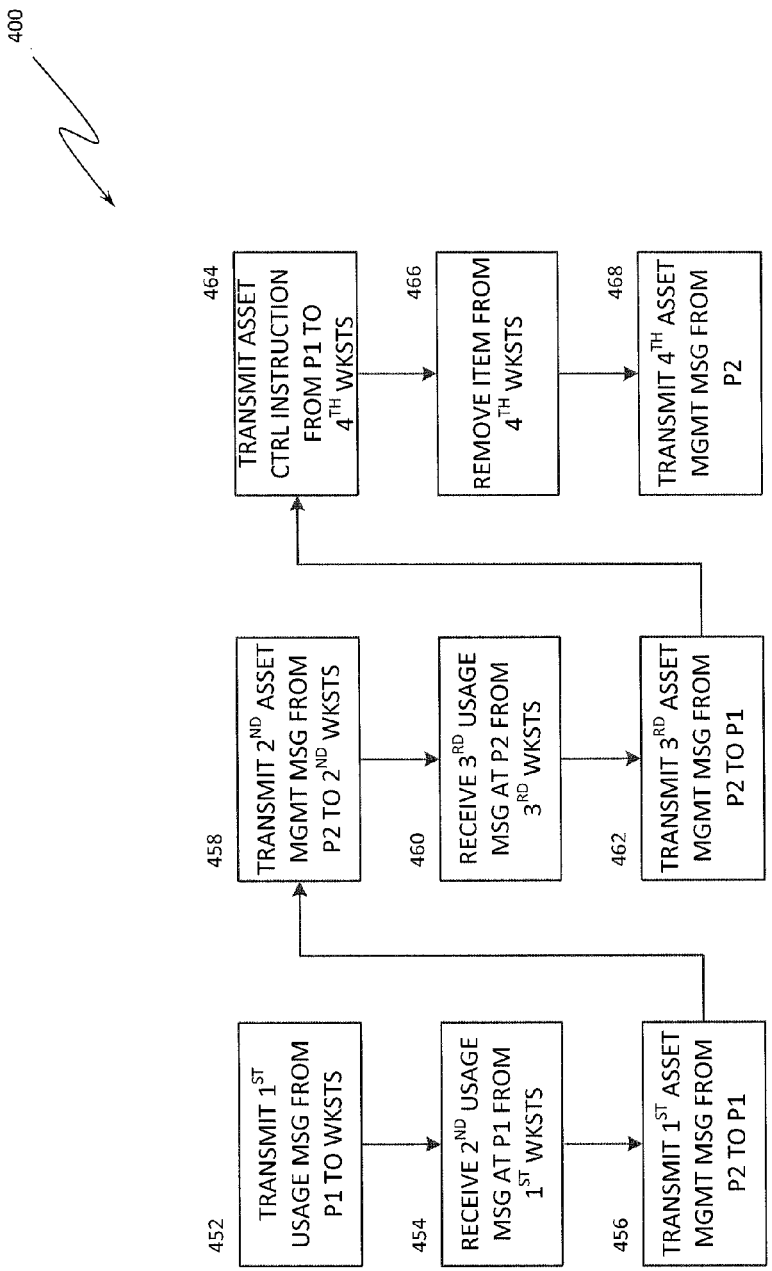
FIG. 4 is a flow chart for a method for managing an asset in a network according to another embodiment of the present subject matter.

Considering FIG. 4, a flow chart 400 is presented for a method for managing an asset in a network according to another embodiment of the present subject matter. While the following description includes messages sent between various processors and/or workstations, those of skill in the art will readily understand that all, or some, of the messages are sent via electronic mail, although other electronic communication means are also contemplated.

At block 452, a first usage message is transmitted from a first processor ("P1") to a set of workstations ("WKSTS"). In an embodiment, the first usage message is an automatic query to the workstations in a network regarding whether a particular asset, such as a software program or module, is installed. The set of workstations may be all the workstations on a network or some predetermined subset of workstations. Additionally, in an embodiment, certain workstations in the set of workstations are in a first segment of the network while other workstations in the set of workstations are in a second segment of the network. It is further contemplated that there may be more segments of the network having workstations assigned thereto. At block 454, the first processor receives a second usage message from each workstation in a first subset of workstations ("$1^{ST}$ WKSTS") in the set of workstations. In an embodiment, the second usage message is an indication that the workstation sending a second usage message either has the asset installed or does not have the asset installed. In another embodiment, only those workstations that have the asset installed send the second usage message.

At block 456, a second processor ("P2") transmits a first asset management message to the first processor. In an embodiment, the first asset management message is sent after receipt of a request from the first processor. In another embodiment, the first asset message is sent to the first processor at a predetermined time interval. In an embodiment, the first asset management message includes a list of those workstations, i.e., a second subset of workstations ("$2^{ND}$ WKSTS"), in the first subset of workstations that are targeted for removal of the asset. At block 458, the second processor transmits a second asset management message to the second subset of workstations. In an embodiment, the second asset management message is a reclamation/removal intent notification.

At block 460, the second processor receives a third usage message from a third subset of workstations ("$3^{RD}$ WKSTS"), where the workstations in the third subset of workstations are also members of the second subset of workstations. In an embodiment, the third usage message is an indication that the workstation sending a third usage message opts out of the asset reclamation/removal process. In another embodiment, the second processor receives a third usage message from each of the workstations in the second subset of workstations and the third usage message includes information regarding either that a workstation opts out of the reclamation/removal process or does not opt out.

At block 462, the second processor transmits to the first processor a third asset management message. In an embodiment, the third asset management message includes instructions to initiate the reclamation/removal process for a fourth subset of workstations ("$4^{TH}$ WKSTS"). In an embodiment, the fourth subset of workstations include those workstations in the second subset of workstations that did not opt out of the reclamation/removal process.

At block 464, the first processor transmits an asset control instruction to each of the workstations in the fourth subset of workstations. In an embodiment, the asset control instruction includes instructions for reclamation/removal of the asset. At block 466, the asset is removed from the workstations in the fourth subset of workstations in response to receipt of the asset control instruction. In an embodiment, a removal message is received at the second processor from each of the workstations in the fourth subset of workstations once the asset is removed. At block 468, the second processor transmits a fourth asset management message to a database. In an embodiment, the fourth asset management message includes information identifying the asset and information identifying the workstations in the fourth subset of workstations.

While some embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method for managing an asset in a network, the method comprising:
    automatically querying a plurality of workstations connected to the network to determine a presence of the asset on each of the plurality of workstations, wherein the automatic querying comprises sending a poll message to each of the plurality of workstations and receiving a response message from each of the plurality of workstations in reply, wherein (a) neither the automatic querying nor the poll message of the automatic querying comprises an instruction to download the asset and (b) neither the automatic querying nor the poll message of the automatic querying comprises an instruction to install the asset;
    categorizing the plurality of workstations into a first group, comprising a first workstation, and a second group, comprising a second workstation, based on the received response messages;
    determining an asset activity metric of the first workstation, the asset activity metric comprising at least one of: (a) a date of last use of the asset and (b) a frequency of use of the asset during a first predetermined time interval;
    based on the determined asset activity metric of the first workstation, sending a first removal message to the first workstation;
    waiting a second predetermined time interval, and after the second predetermined time interval has elapsed, sending a second removal message to the first workstation, the second removal message comprising an instruction to remove the asset;
    receiving an asset removal confirmation from the first workstation; and
    updating a first database based on receipt of the removal confirmation from the first workstation;
    wherein (a) the asset is loaded on the first workstation both (i) directly before the first workstation receives the poll message and (ii) directly after the first workstation transmits the response message in reply to the poll message; and
    (b) the asset is not loaded on the second workstation both (i) directly before the second workstation receives the poll message and (ii) directly after the second workstation transmits the response message in reply to the poll message.

2. The method of claim 1, further comprising:
    receiving an asset install request from a third workstation;
    verifying availability of the asset with a second database based on receipt of the asset install request from the third workstation;
    providing the asset to the third workstation for installation based on a positive verification;
    determining if the first workstation and the third workstation are in a same network segment; and
    updating a third database based on a determination that the first workstation and the third workstation are in different network segments.

3. A system for managing an asset in a network, the system comprising a plurality of workstations connected to the network and a processor configured to:
    automatically query the plurality of workstations to determine a presence of the asset on each of the plurality of workstations, wherein the automatic querying comprises sending a poll message to each of the plurality of workstations and receiving a response message from each of the plurality of workstations in reply, wherein (a) neither the automatic querying nor the poll message of the automatic querying comprises an instruction to download the asset and (b) neither the automatic querying nor the poll message of the automatic querying comprises an instruction to install the asset;
    categorize the plurality of workstations into a first group, comprising a first workstation, and a second group, comprising a second workstation, based on the received response messages;
    determine an asset activity metric of the first workstation, the asset activity metric comprising at least one of: (a) a date of last use of the asset and (b) a frequency of use of the asset during a first predetermined time interval;
    send a first removal message to the first workstation based on the determined asset activity metric of the first workstation;
    wait a second predetermined time interval, and after the second predetermined time interval has elapsed, send a second removal message to the first workstation, the second removal message comprising an instruction to remove the asset;
    receive an asset removal confirmation from the first workstation; and
    update a first database based on receipt of the removal confirmation from the first workstation;
    receive an asset install request from a third workstation, of the plurality of workstations;

verify availability of the asset via a second database based on receipt of the asset install request from the third workstation;
authorize the third workstation to install the asset based on a positive verification.

4. The method of claim 2, further comprising:
receiving an asset removal confirmation from a fourth workstation;
updating the first database based on receipt of the removal confirmation from the fourth workstation;
receiving an asset install request from a fifth workstation;
verifying availability of the asset with the second database based on receipt of the asset install request from the fifth workstation;
providing the asset to the fifth workstation for installation based on a positive verification;
determining if the fourth workstation and the fifth workstation are in a same network segment; and
not updating the third database based on a determination that the fourth workstation and the fifth workstation are in the same network segment.

5. A system for managing an asset in a network comprising a processor group comprising one or more processors, the processor group being configured to perform the method of claim 1.

6. The method of claim 1, wherein the plurality of response messages comprises first response messages and second response messages;
the first response messages indicating that the asset is present and the second response messages indicating that the asset is absent;
the response message from the first workstation being the first response message, the response message from the second workstation being the second response message;
wherein the step of categorizing the plurality of workstations into the first and second groups is based on whether each workstation, of the plurality of workstations, sent the first response message or the second response message in reply to the poll message.

7. The method of claim 6, wherein the plurality of response messages consists of the first and second response messages.

8. The method of claim 6, further comprising determining asset activity metrics for each of the first group of workstations and not determining asset activity metrics for any of the second group of workstations.

9. The method of claim 6, wherein the plurality of workstations comprises a third workstation loaded with the asset, the method further comprising:
determining the asset activity metric of the third workstation, and
based on the determined asset activity metric of the third workstation, not sending the first removal message to the third workstation.

10. The system of claim 3,
wherein the processor comprises one or more different processors.

11. The system of claim 10, wherein the response message is at least one of a first response message and a second response message, and each workstation comprises workstation memory;
each workstation being configured to:
determine whether the asset is locally stored in the workstation memory based on receipt of the poll message;
if the asset is locally stored in the workstation memory, transmit the first response message to the processor;
if the asset is not locally stored in the respective workstation memory, transmit the second response message to the processor.

12. The system of claim 11, wherein the processor is configured to (a) categorize each workstation that transmitted the first response message into the first group and (b) categorize each workstation that transmitted the second response message into the second group.

13. The system of claim 3, wherein the processor is configured to:
receive a rejection message from the first workstation; and
based on the receipt of the rejection message, not send the second removal message to the first workstation.

14. The system of claim 13, wherein the processor is configured to only send the second removal message to the first workstation if (a) the second predetermined time interval has elapsed and (b) the processor has not received the rejection message from the first workstation.

15. The system of claim 3, wherein the processor is configured to (a) determine whether each of the first group of workstations is a member of an opt-out list and (b) not send the first removal message to any members of the opt-out list.

16. A method for managing an asset in a network, the method comprising:
automatically querying a plurality of workstations connected to the network to determine a presence of the asset on each of the plurality of workstations, wherein the automatic querying comprises sending a poll message to each of the plurality of workstations and receiving a response message from each of the plurality of workstations in reply, wherein (a) neither the automatic querying nor the poll message of the automatic querying comprises an instruction to download the asset and (b) neither the automatic querying nor the poll message of the automatic querying comprises an instruction to install the asset;
categorizing the plurality of workstations into a first group, comprising a first workstation, and a second group, comprising a second workstation, based on the received response messages;
determining an asset activity metric of the first workstation, the asset activity metric comprising at least one of: (a) a date of last use of the asset and (b) a frequency of use of the asset during a first predetermined time interval;
based on the determined asset activity metric of the first workstation, sending a first removal message to the first workstation;
waiting a second predetermined time interval, and after the second predetermined time interval has elapsed, sending a second removal message to the first workstation, the second removal message comprising an instruction to remove the asset;
receiving an asset removal confirmation from the first workstation; and
updating a first database based on receipt of the removal confirmation from the first workstation;
receiving an asset install request from a third workstation;
verifying availability of the asset with a second database based on receipt of the asset install request from the third workstation;
providing the asset to the third workstation for installation based on a positive verification;

determining if the first workstation and the third workstation are in a same network segment; and updating a third database based on a determination that the first workstation and the third workstation are in different network segments.

17. A method for managing an asset in a network, the method comprising:

automatically querying a plurality of workstations connected to the network to determine presence of the asset on each of the plurality of workstations, wherein the automatic querying comprises sending a poll message to at least some of the plurality of workstations and receiving a response message from at least some of the polled workstations in reply, wherein (a) neither the automatic querying nor the poll message of the automatic querying comprises an instruction to download the asset and (b) neither the automatic querying nor the poll message of the automatic querying comprises an instruction to install the asset;

categorizing at least some of the plurality of workstations into a first group, comprising a first workstation, and a second group, comprising a second workstation, based on the received response messages;

sending a removal message to the first workstation, the removal message comprising an instruction to remove the asset;

receiving an asset removal confirmation from the first workstation; and updating a first database based on receipt of the asset removal confirmation from the first workstation;

wherein (a) the asset is loaded on the first workstation both (i) directly before the first workstation receives the poll message and (ii) directly after the first workstation transmits the response message in reply to the poll message; and (b) the asset is not loaded on the second workstation both (i) directly before the second workstation receives the poll message and (ii) directly after the second workstation transmits the response message in reply to the poll message.

18. The method of claim 17, wherein first workstation is configured to automatically, and without user intervention, prepare and transmit the response message after receiving the poll message.

19. The method of claim 17, further comprising:

determining an asset activity metric of the first workstation, the asset activity metric comprising at least one of: (a) a date of last use of the asset, and (b) a frequency of use of the asset during a first predetermined time interval;

sending a first removal message to the first workstation based on at least one of: (a) the date of last use of the asset on the first workstation and (b) the frequency of use of the asset on the first workstation during the predetermined time interval.

20. The method of claim 17, wherein the first workstation is configured to:

remove the asset based on receipt of the removal message; and automatically generate and send the asset removal confirmation after determining that the asset has been removed.

21. A system for managing an asset in a network comprising a processor group comprising one or more processors, the processor group being configured to perform the method of claim 17.

* * * * *